June 29, 1965
R. K. TETER
3,192,394
GENERATOR AUTOMATIC IDLE CONTROL CIRCUIT
Filed Feb. 8, 1962
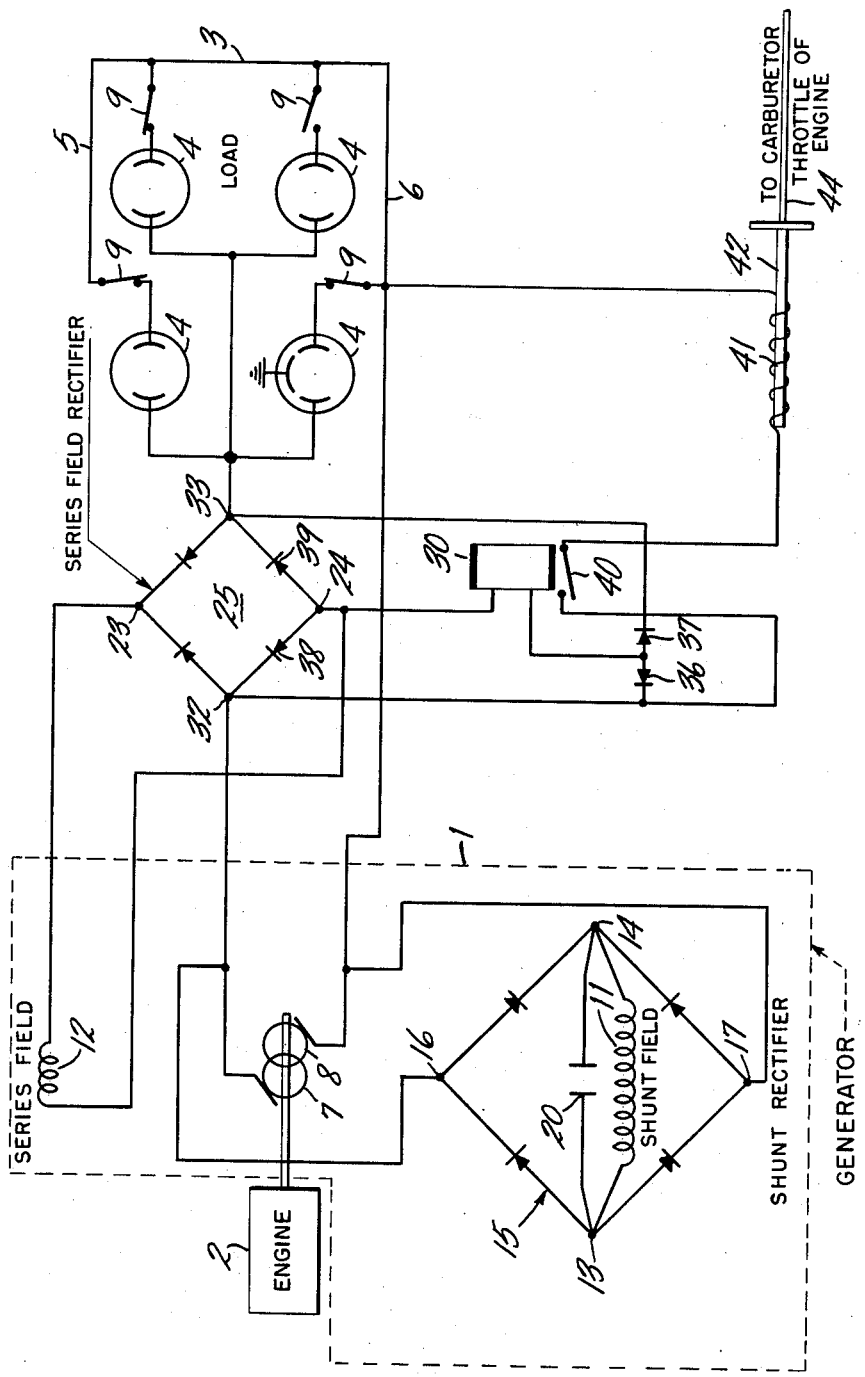

United States Patent Office 3,192,394
Patented June 29, 1965

3,192,394
GENERATOR AUTOMATIC IDLE CONTROL CIRCUIT
Robert K. Teter, Port Chester, N.Y., assignor to Textron Inc., a corporation of Rhode Island
Filed Feb. 8, 1962, Ser. No. 172,003
5 Claims. (Cl. 290—40)

This invention relates generally to generators and more particularly to a control circuit for an idling control system for generators.

The use of sensitive current-responsive elements such as relays in idle control systems for generators driven by internal combustion engines or other prime movers is known. These idling control systems function to cause the prime mover to drive the generator at an idling speed when there is no current being drawn from the generator and will speed up the prime mover to proper operating speed to provide the rated voltage whenever a load is connected to the generator. The idling systems thus greatly improve the efficiency of driven generators since the prime mover is operated at idling speed, resulting in a substantial reduction in the use of fuel, when the load circuit connected thereto is not loaded.

A particular problem in the known idling systems has been that of providing a highly sensitive control circuit or control device that will respond to the flow of a load current of a very low value to cause the prime mover to come up to operating speed to provide the required voltage. This is particularly true if the initial load is relatively small, for example when a low wattage electric lamp is turned "on." On the other hand, when the generator is operating at full voltage and full load the current through the load circuit may be of a very high value presenting another problem since the current may exceed the current toleration of the control device or unit, for example a relay responsive directly to the load current, which senses the load current and actuates the idling control system.

It is known to connect, in parallel with a current-responsive element, in a control circuit a non-linear current control unit having the characteristic that the voltage across it remains approximately constant regardless of the current passing through it for increasing the operating range of the current-responsive element which brings the prime mover up to proper operating speed. A system of this type controlling the idling of an engine by the use of a sensitive relay in series with a load circuit and a non-linear current controlling unit connected in parallel with the operating coil of the relay is disclosed in the United States patent to Anderson et al., No. 2,942,122. The use of non-linear elements in this type of arrangement requires a relatively large non-linear unit in order that it can tolerate the full load current. The present invention is an improvement of this type of idling system.

It is a principal object of the invention to provide an electrical control circuit that will be highly sensitive to a load current and readily respond thereto and is applicable, for example, for controlling a generator driven by an internal combustion engine.

Another object of the present invention is to provide an automatic idling control circuit in which the units for effecting control of the idling system are very small in size compared to the units or elements employed in known generator idling systems thereby to provide a compact, light idling system particularly advantageous for use on portable engine-driven generators.

A feature of the present invention is the provision of a highly sensitive relay, preferably of the D.C. type, connected in parallel with static load-carrying rectifiers which are part of the basic generator and are used for rectifying the load current applied to a series field coil of the generator to give the generator the characteristics of a compound D.C. generator to maintain a substantially constant terminal voltage under all conditions. In order to supply the direct current relay with direct current two rectifiers are used, as part of a control circuit of the control system, connected across terminals of two load-carrying rectifiers of the series field rectifier of the generator. The rectifiers providing the D.C. current for the relay are connected across A.C. terminals of the series field rectifier and carry only the current of the relay which is very small and, therefore, the rectifiers can be very small in size so that the control system for idling the generator substantially adds very little in size or weight to the basic generator.

While the invention is applicable to engine-driven generators and will be so explained it will be understood that it can be applied to control systems in which relays or other current-responsive elements must respond to the flow of an initial variable current and yet are incapable of tolerating anything comparable to the maximum value of the current being sensed.

Other features and advantages of the control circuit in accordance with the present invention will be better understood as described in the following specification and appended claims, in conjunction with the drawing.

The generator shown, by way of example, in the drawing comprises an electric generator illustrated as an alternator 1 driven by a prime mover, for example an internal combustion engine 2, and supplying current to a load circuit 3. The load is illustrated schematically as comprising a plurality of output receptacles 4 connected in parallel with one another across lines 5 and 6 which are connected respectively to collector rings or slip rings 7 and 8 of the alternator 1. Means, illustrated as switches 9, are provided for turning individual load units "on" and "off". The output receptacles 4 provide for connecting electric lights, electric tools or other electrically operated units to the load circuit of the alternator.

The alternator 1 is self-excited and is provided with a shunt winding 11 and a series winding 12. The shunt winding 11 is connected across D.C. terminals of a shunt rectifier bridge 15 having A.C. terminals 16, 17 connected respectively to the collector rings 7 and 8 of the alternator. The rectifiers of the shunt rectifier bridge 15 are static rectifiers preferably silicon or germanium dry rectifiers. A capacitor 20 is connected in parallel with the shunt field winding 11.

The series field winding 12 is connected across D.C. terminals 23, 24 of a series rectifier bridge 25. The series field winding 12 of the alternator is connected in series with the load and by reason of the rectifier 25 the current through the field winding 12 is always in the same direction despite the fact that the output of the alternator is A.C. It will thus be seen that the alternator is self-excited but that excitation is achieved without use of a commutator. This is referred to as static excitation. The rectifiers of the series rectifier bridge 25 are made of selenium or silicon, or magnesium-copper, sulphide, but selenium is preferred. The series field coil or winding gives the generator the characteristics of a compound D.C. generator so that it maintains a substantially constant terminal voltage under all variable load conditions.

In order for the generator to operate properly at rated voltage whenever a load is turned on, regardless of its value, the engine 2 must drive the alternator 1 at a proper speed so that the rated or proper voltage is provided. In the absence of a load, provision must be made, if the generator is to operate efficiently, to reduce the speed to an idling speed. In order to provide for this variable operation a control circuit is provided comprising a D.C.

relay having an operating coil 30 connected in parallel with the series field rectifier bridge 25 across A.C. terminals 32, 33 thereof. Since the series field rectifier 25 is rectifying current only for the series field provision is made for supplying D.C. current to the operating coil 30 of the relay from two germanium rectifiers 36, 37 connected in the control circuit across the A.C. terminals 32, 33 of the series field rectifier. The germanium rectifiers are, therefore, connected, in a full wave center tap circuit configuration, across two arms of the bridge rectifier, namely across the terminals of two load-carrying rectifiers 38, 39 each in series with the coil 30 connected between a center tap between the two rectifiers 36, 37 and a center tap on the bridge rectifier 25 formed by the D.C. terminal 24 as illustrated in the drawing.

The relay and its rectifiers are thus connected in the load circuit of the generator over the entire range of the output of the generator and the relay can be made as sensitive to a small load on the generator as desired. The series field rectifiers will not allow any current to pass until the voltage across them reaches a certain threshold value but will allow large currents to pass without a large increase voltage across their terminals. The germanium rectifiers carry only the current of the relay, for example one ampere maximum, and are, therefore, very small in size so that the control unit and control circuit are highly miniaturized in comparison with the known control units and circuits. The control circuit of the invention is thus formed of static electrical units and moving parts are kept to a minimum greatly simplifying the construction of the control system and insuring optimum operating characteristics and minimum wear for field use. The small size and reliability of the elements employed in the control circuit makes it particularly advantageous for use in movable units, for example, in portable engine-driven generators. The germanium rectifiers have the characteristic of having a very low voltage drop in the direction of the current flow and consequently do not substract substantially from the threshold voltage provided by the load-carrying rectifiers so that no changes in the basic generator with respect to desired threshold voltage result.

In operation as a load is applied at any of the receptacles 4 a very light load current will cause the operating coil 30 to be energized so that the relay closes its contact 40 energizing a solenoid winding 41 actuating a solenoid armature 42 connected to a linkage system 44 operative to control the throttle, not shown, of the engine 2 to bring it up to operating speed so that the proper voltage is provided. Automatic idle control elements, not shown, and well known in the art, as for example as disclosed in the United States Patent No. 2,942,122 to Anderson et al. are provided as well as elements, not shown, for returning the linkage system 44 to a position in which the throttle of the engine idles the engine in the absence of a load current de-energization of the relay coil 30. These control units are well known and are not shown.

While the control circuit could be operated with an A.C. type relay directly across one rectifier of the series field rectifier it has been found that better sensitivity is obtained by use of a D.C. type relay connected as heretofore described.

While a preferred embodiment of the invention has been shown and described it will be understood that many modifications and changes can be made within the true spirit and scope of the invention.

What I claim and desire to secure by Letters Patent is:

1. In an electrical circuit having a driven source of electrical current, a load circuit connected to receive current from said source, means including speed control means to cause the current source to be driven at a predetermined operating speed in response to a minimum value of current flow in said load circuit, said speed control means including means to cause the driven current source to be driven at a predetermined idling speed substantially lower than said operating speed in the absence of said minimum current flow in said load circuit, means electrically connected to said source and said load circuit to maintain a substantially constant terminal voltage at said source under variable load conditions comprising, first rectifier means electrically connected to said load circuit capable of passing large load currents without substantial increase in voltage across thereof having A.C. terminals and a preselected threshold voltage, the improvement which comprises a control circuit for actuating said speed control means comprising a sensitive current-responsive means energizable by a minimum current flow in said load circuit constantly connected in circuit with said load circuit to initiate actuation of said speed control means to cause it to bring the speed at which said source is driven under control of the load current to a given operating speed, means connecting said sensitive current-responsive means with said first rectifier means to respond to load current flowing therein, second rectifier means connected across said A.C. terminals connected for providing direct current to said current-responsive means for energizing it in response to load current flowing through said first rectifier means, and said means connecting said current-responsive means connecting said current-responsive means and said second rectifier means to said first rectifier means in a full wave center tap circuit configuration.

2. In an electrical circuit having a driven source of electrical current, a load circuit connected to receive current from said source, means including speed control means to cause the current source to be driven at a predetermined operating speed in response to a minimum value of current flow in said load circuit, said speed control means including means to cause the driven current source to be driven at a predetermined idling speed substantially lower than said operating speed in the absence of said minimum current flow in said load circuit, means electrically connected to said source and said load circuit to maintain a substantially constant terminal voltage at said source under variable load conditions comprising, first rectifier means electrically connected to said load circuit capable of passing large load currents without substantial increase in voltage across thereof having A.C. terminals, a D.C. center tap intermediate two of said A.C. terminals, and a preselected threshold voltage, the improvement which comprises a control circuit for actuating said speed control means comprising a sensitive current-responsive means energizable by a minimum current flow in said load circuit constantly connected in circuit with said load circuit for controlling the voltage output of said current source under control of the load current and to initiate actuation of said speed control means to cause it to bring the speed at which said source is driven under control of the load current to a given operating speed, connections connecting said sensitive current-responsive means with said first rectifier means to respond to load current flowing therein, second rectifier means having a center tap and a very low voltage drop in the direction of current flow connected across said two A.C. terminals for providing direct current to said current-responsive means for energizing it in response to load current flowing through said first rectifier means, and said connections comprising means connecting said current-responsive means to said center tap of said first rectifier means and said center tap of said second rectifier means.

3. In an electrical circuit having a driven source of electrical current, an A.C. load circuit connected to receive current from said source, means including speed control means to cause the current source to be driven at a predetermined operating speed in response to a minimum value of current flow in said load circuit, said speed control means including means to cause the driven current source to be driven at a predetermined idling speed substantially lower than said operating speed in the absence of said minimum current flow in said load circuit, means electrically connected to said source and said load circuit to maintain a substantially constant terminal voltage at said source under variable load conditions comprising, first rectifier means electrically connected to said load circuit in a bridge configuration capable of passing large load currents without substantial increase in voltage across thereof having A.C. terminals, a D.C. center tap intermediate two of said A.C. terminals, and a preselected threshold voltage, the improvement which comprises a control circuit for actuating said speed control means comprising a sensitive current-responsive means energizable by a minimum current flow in said load circuit constantly connected in circuit with said load circuit for controlling the voltage output of said current source under control of the load current and to initiate actuation of said speed control means to cause it to bring the speed at which said source is driven under control of the load current to a given operating speed, connections connecting said sensitive current-responsive means with said rectifier means to respond to load current flowing therein, second dry rectifier means having a center tap and a very low voltage drop in the direction of current flow connected across said A.C. terminals for providing direct current to said current-responsive means for energizing it in response to load current flowing through said first rectifier means, and said connections comprising means connecting said current-responsive means to said center tap of said first rectifier means and said center tap of said second rectifier means.

4. In an electrical circuit having a driven source of electrical current, a load circuit connected to receive current from said source, means including speed control means to cause the current source to be driven at a predetermined operating speed in response to a minimum value of current flow in said load circuit, said speed control means including means to cause the driven current source to be driven at a predetermined idling speed substantially lower than said operating speed in the absence of said minimum current flow in said load circuit, means electrically connected to said source and said load circuit to maintain a substantially constant terminal voltage at said source under variable load conditions comprising, static first rectifier means electrically connected to said load circuit in a bridge configuration capable of passing large load currents without substantial increase in voltage across across thereof having A.C. terminals and a preselected threshold voltage, the improvement which comprises a control circuit for actuating said speed control means comprising a sensitive current-responsive means energizable by a minimum current flow in said load circuit constantly connected in circuit with said load circuit for controlling the voltage output of said current source under control of the load current and to initiate actuation of said speed control means to cause it to bring the speed at which said source is driven under control of the load current to a given operating speed, means connecting said sensitive current-responsive means with said first rectifier means to respond to load current flowing therein, second rectifier means having a very low voltage drop in the direction of current flow connected across said A.C. terminals each in series with said current-responsive means for providing direct current to said current-responsive means for energizing it in response to said minimum current flow in said load circuit connected between a center tap between the two rectifiers 36, 37 and a center tap on the bridge rectifier 25 formed by the D.C. terminal 24.

5. In an electrical circuit having a driven source of electrical current, a load circuit connected to receive current from said source, means including speed control means to cause the current source to be driven at a predetermined operating speed in response to a minimum valve of current flow in said load circuit, said speed control means including means to cause the driven current source to be driven at a predetermined idling speed substantially lower than said operating speed in the absence of said minimum current flow in said load circuit, means electrically connected to said source and said load circuit to maintain a substantially constant terminal voltage at said source under variable load conditions comprising, a first rectifier circuit electrically connected in a bridge configuration to said load circuit comprising rectifiers capable of passing large load currents without substantial increase in voltage across thereof having A.C. terminals, a D.C. center tap, and a preselected threshold voltage, the improvement which comprises a control circuit for actuating said speed control means comprising a sensitive current-responsive means energizable by current flow in said load circuit constantly connected in circuit with said load circuit for controlling the voltage output of said current source under control of the load current and to initiate actuation of said speed control means to cause it to bring the speed at which said source is driven under control of the load current to a given operating speed, connections connecting said sensitive current-responsive means with said rectifier means to respond to load current flowing therein, second rectifier means having a very low voltage drop in the direction of current flow connected across said A.C. terminals for providing direct current to said current-responsive means for energizing it, and said connections comprising a connection connecting said current-responsive means to said D.C. center tap intermediate said two A.C. terminals of said rectifier bridge and connections connecting said second rectifier means each across a respective one of two arms of said bridge circuit and each in series with said current-responsive means and connecting said second rectifier means to said A.C. terminals and across said two arms of said rectifier bridge circuit.

References Cited by the Examiner
UNITED STATES PATENTS
2,942,122   6/60   Anderson et al.

ORIS L. RADER, *Primary Examiner.*